Jan. 30, 1962  H. E. HAXO ETAL  3,018,812
ADHERING VINYLPYRIDINE-BUTADIENE RUBBERS
TO OTHER RUBBERS
Filed Aug. 25, 1958
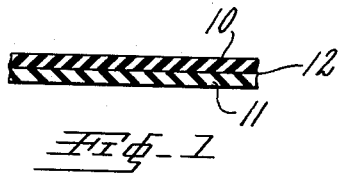
_Fig. 1_
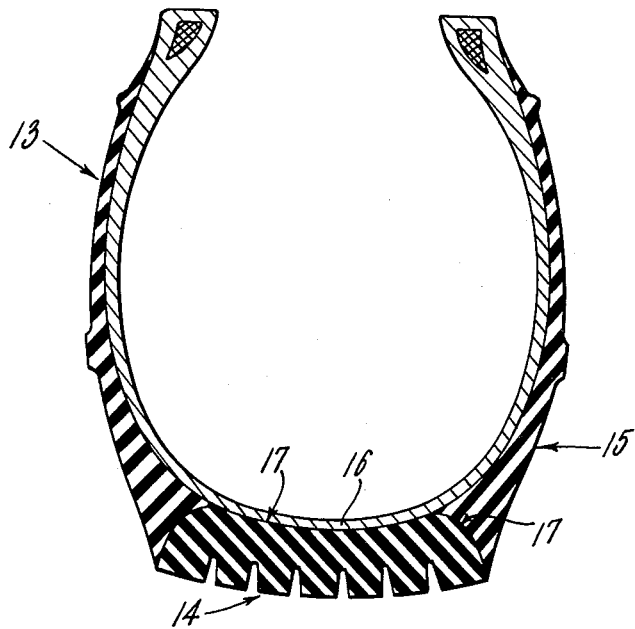
_Fig. 2_
INVENTORS
HENRY E. HAXO
BERNARD C. BARTON
IRWIN J. SCHAFFNER
BY
Maurice B. Stiefel
ATTORNEY United States Patent Office 3,018,812
Patented Jan. 30, 1962

3,018,812
ADHERING VINYLPYRIDINE-BUTADIENE
RUBBERS TO OTHER RUBBERS
Henry E. Haxo, Wayne, Bernard C. Barton, Butler, and Irwin J. Schaffner, Hohokus, N.J., assignors to United States Rubber Company, New York, N.Y., a corporation of New Jersey
Filed Aug. 25, 1958, Ser. No. 756,842
10 Claims. (Cl. 152—330)

This invention relates to an improved method of adhering vinylpyridine rubbers to other rubbers and to the improved laminar vulcanizate obtained. More particularly, this invention relates to the use of aniline-aldehyde condensation products at the surface of a hydrocarbon rubber to be bonded by vulcanization to a vinylpyridine-butadiene rubber in order that the vulcanizate be more strongly and more permanently bonded.

Vinylpyridine-butadiene rubber has been observed to have abrasion resistance considerably superior to that of other rubbers such as GR-S (rubbery copolymer of butadiene and styrene) or natural rubber (Hevea). Accordingly, such vinylpyridine-butadiene rubber would be admirably suited for use in tire treads.

However, all prior attempts to achieve in vulcanized products consistently satisfactory adhesion between a vinylpyridine-butadiene rubber tread stock and a carcass of either GR-S or Hevea have met with failure. As the vinylpyridine content of the vinylpyridine-butadiene rubber increases, the adhesion to Hevea or GR-S stocks decreases, with as little as 2% of vinylpyridine having an adverse effect. When the vinylpyridine content of the vinylpyridine-butadiene rubber reaches 8% the adhesion is clearly inadequate. Yet the vinylpyridine-butadiene rubbers having the greatest utility insofar as abrasion resistance is concerned are found to be those having a vinylpyridine content in the range of 8 to 30%. It is believed that the resulting lack of adhesion in the vulcanizates, between plied-together vinylpyridine-butadiene rubber (wherein the vinylpyridine content is between 8 and 30%) and SBR or Hevea is due to differences in curing rates between the two rubber surfaces. A number of tests on a large number of experimental tires have indicated that conventional rubber adhesives do not solve the above problem.

Accordingly, it is an object of our invention to provide an improved method for adhering vinylpyridine-butadiene rubbers to natural or GR-S rubber. Another object of our invention is to provide an improved method of adhering such vinylpyridine-butadiene rubber to GR-S or natural rubber wherein the vinylpyridine-butadiene rubber has a vinylpyridine content of between 8 and 30%. A further object of our invention is to provide a laminar vulcanizate wherein one of the layers comprises a vinylpyridine-butadiene rubber having a vinylpyridine content of between 8 to 30% and wherein the other layer is either natural rubber or GR-S rubber, the adhesion between these two layers being vastly improved over prior art adhesions. Another object is to obtain an improved tire having a tread stock of vinylpyridine-butadiene rubber, the tread stock being closely adhered to a carcass rubberized with natural rubber or GR-S rubber. Additional objects will become apparent hereinafter.

In the patent literature there are many disclosures involving the application of a vulcanizing agent or a vulcanization accelerator to the surface of a rubber stock. The chemical so applied diffuses into the rubber and effects or promotes a cure. The following U.S. patents are typical of the prior art disclosures: 1,579,169 to Venosta; 1,551,042 to Miller; 1,574,676 to Morton; 1,961,908 to Murray; and 2,033,962 to Waber. As taught by the prior art there cannot be satisfactory vulcanization without the use of a chemical that does diffuse, for the rubber stocks as initially prepared in such case are not fully compounded.

There are other prior art references which disclose the use of a small quantity of a vulcanization accelerator, wherein the accelerator is applied to the surface of a fully compounded rubber. An example of this is Dickson U.S. Patent 1,564,050, wherein a vulcanization accelerator is applied to the surface of a fully compounded rubber, the quantities of the accelerator being so small as to be effective upon the surface portion only. It will be noted, however, that Dickson's purpose is to prevent adhesion to the mold and also to prevent the adhesion of one unvulcanized sheet of rubber to another. Thus, Dickson's purpose is to reduce tackiness, rather than to increase adhesion.

According to this invention, we have discovered that certain aniline-aldehyde condensation products, not in themselves adhesives, have the unique property of effecting consistently satisfactory adhesion between a vinylpyridine-butadiene rubber stock and a hydrocarbon rubber stock when applied to the face of the latter stock prior to cure of the laminated assembly. In the preferred practice of our invention we apply the aniline-aldehyde condensation product by gassing [1] the surface of a vulcanizable stock of Hevea or GR-S or blends thereof with a solution of the condensation product in a volatile hydrocarbon solvent, and then pressing a vulcanizable vinylpyridine rubber stock against the gassed surface. It is important to note that both the vinylpyridine rubber stock and the stock to which it is to be adhered are fully compounded and do not depend for their cure on the said condensation product applied to the surface, and the cohesion of the raw rubber surfaces is in no way affected by the presence of the condensation product.

In the accompanying drawings FIG. 1 illustrates a composite of two layers of rubber adhered to one another. FIG. 2 is a cross-sectional view through a pneumatic tire.

Referring to the drawings, the laminate of FIG. 1 consists of a layer 10 of vinylpyridine-butadiene rubber and a second layer 11 of either natural or GR-S rubber. To the surface 12 of the said second layer has been applied an aniline-aldehyde condensation product, more fully described hereinafter.

FIG. 2 illustrates a pneumatic tire casing 13, having a tread stock 14 made of vinylpyridine-butadiene rubber and a sidewall stock 15, usually made of GR-S or Hevea or a mixture thereof. The plies 16 have been rubberized with either natural or GR-S rubber in the conventional manner. The tread stock 14 is adhered to the sidewalls 15 and to the rubberized plies 16 by application of the said aniline-aldehyde condensation product to the surfaces 17 of the said sidewalls and plies, pressing the said tread stock against the said sidewalls and plies, with subsequent vulcanization of the composite article.

We have found that the only aniline-aldehyde condensates which are effective in the invention are those obtained by condensing aniline with an aliphatic aldehyde having from 4 to 7 carbon atoms. Thus, the aniline-aldehyde condensates employed include aniline-butyraldehyde, aniline-valeraldehyde, aniline-caproaldehyde, and aniline-heptaldehyde. The preparation of the aniline-aldehyde condensate may be carried out as described in U.S. Patents 1,417,970 and 1,804,398.

We apply the aniline-aldehyde condensate to the GR-S or Hevea stock face with which the vinylpyridine-butadiene rubber stock is to be plied. We have found that the

[1] The term "gassing" in the rubber industry refers to wiping a rubber surface with a rag which has been dipped in a suitable solvent, such as hexane. It is generally done to renew the tack of unvulcanized rubber surfaces.

adhesion fails if the condensate is applied instead to the vinylpyridine-butadiene rubber stock.

The aniline-aldehyde condensation products of this invention function as specific vulcanization accelerators for rubbers which are to be bonded to vinylpyridine-butadiene copolymers. The accelerator does not function as an adhesive in the ordinary sense in forming a distinct intermediate layer between the two rubber surfaces; rather, it acts to modify a rubber surface which upon being cured in contact with the vinylpyridine-butadiene rubber achieves enhanced, integral and direct adhesion of the two rubbery surfaces. The aniline-aldehyde condensation products when dissolved in a solvent penetrate and diffuse a short distance into the surface of the rubber to be bonded to the vinylpyridine rubber. In the absence of the aniline-aldehyde condensation products different rates of cure are obtained resulting in a rubber interface with inferior bonding of the two surfaces.

Our invention is particularly valuable in the construction of pneumatic tires, in which a calendered or extruded tread stock is applied to a carcass consisting of several plies of fabric-reinforced Hevea and/or GR-S stock (with or without the interposition of a cushion or undertread layer comprising GR-S), the whole assembly being thereafter shaped and vulcanized in a mold under heat and pressure. It is obviously of paramount importance to the utility of a tire that the adhesive bond between the tread stock (made of vinylpyridine-butadiene rubber) and the carcass be consistently of a high order, since the forces tending to throw off the tread are very large, particularly at the high speeds of modern cars.

In the following example all parts are by weight.

Example 1

The high order of adhesion between GR-S or Hevea stocks and vinylpyridine-butadiene stocks obtained by our invention is illustrated in a simple manner as follows. A copolymer of 2-methyl-5-vinylpyridine and butadiene was compounded with carbon black and curatives in the manner usual for a tire tread. A GR-S/Hevea blend was also compounded with carbon black and curatives. The formulations of these two stocks are given below.

|  | Vinylpyridine-Butadiene Rubber Stock | Hevea/GR-S Stock |
|---|---|---|
| Vinylpyridine-Butadiene Rubber [1] | 100 | |
| GR-S | | 20 |
| Smoked sheet | | 80 |
| Carbon black | 45 | 35 |
| Deenax (alkylphenol) | 1 | |
| Paraflux (asphaltum) | 3 | |
| Stearic Acid | 2 | 4.5 |
| Zinc Oxide | 3 | 5 |
| Pine Tar | | 2.2 |
| BLE 25 (acetone-diphenylamine condensate) | | 0.77 |
| Santoflex AW (6-ethoxy-1,2-dihydro-2,2,4-trimethyl-quinoline) | | 2.00 |
| N,N'-Diphenyl-p-phenylenediamine | 0.35 | 0.13 |
| Santocure NS (N-tert-butyl-2-benzothiazole-sulfenamide) | 0.3 | 0.6 |
| Sulfur | 1.75 | 2.25 |

[1] 25/75 copolymer of 2-methyl-5-vinylpyridine and butadiene.

These stocks were used in the preparation of adhesion test pads as follows:

Slabs of the two stocks were cut, 4 inches by 4 inches by 0.11″. A GR-S/Hevea slab was gassed with a toluene solution of an aniline-aldehyde condensate on one face, onto which was then pressed a slab of the vinylpyridine-butadiene rubber stock. The composite slab was then backed with fabric on both outer faces and cured in a press at 145° C. As controls, other pads were made from the two stocks in the same way except that the gassing was done with pure toluene in one case and the gassing was omitted altogether in the other. After cure, each pad was cut into strips one inch wide and the steady pull required to separate the stocks at 250° F. was measured. The results, given in the table below, are expressed in pounds pull per inch of width.

| Solution [1] Used to Gas the Hevea/GR-S Stock | Adhesion Between Vinylpyridine-Butadiene Stock and Hevea/GR-S Stock at 250° F. (Pounds Per inch) |
|---|---|
| None (control) | 13 |
| Pure Toluene (control) | 14 |
| Butyraldehyde-Aniline Condensate | 55 |
| Heptaldehyde-Aniline Condensate | 43 |

[1] 6% in toluene by weight.

From the foregoing it will be seen that the use of an aniline-aldehyde condensation product increased the adhesion up to four times that of the controls. We have found that when the comparison is made in actual tires by road test, the results are even more striking. In vinylpyridine-butadiene-treaded tires made without the benefit of the present invention, early failure by tread separation occurs under moderately severe conditions to such an extent that the tires are not acceptable commercially. On the other hand, in tires made by the method of the present invention, this type of failure is eliminated, even under severe operating conditions.

It should be noted that our invention is applicable for securing consistently high adhesion between vinylpyridine-butadiene rubber stocks and either Hevea stocks, GR-S stocks, or blends of the two. However, our invention is also applicable for securing high adhesion between vinylpyridine-butadiene rubber and other hydrocarbon rubbers, such as cis-polybutadiene and cis-polyisoprene. By "cis-polybutadiene" we mean both the high cis-content polybutadienes made by heterogeneous catalysis and also the rubbery polybutadienes of lower cis-content made by emulsion polymerization or by alfin polymerization "Cis-polyisoprene" includes both natural (Hevea) and synthetic cis-polyisoprenes. Other synthetic rubber materials which can be adhered to vinylpyridine-butadiene rubber by our invention include rubbery homopolymers or copolymers of 2,3-dimethyl-butadiene-1,3; 1,3-pentadiene; methyl-1,3-pentadienes; etc.

Throughout the specification the expression vinylpyridine-butadiene rubber has been used to apply to all of the vinylpyridine-butadiene rubbers known. Thus, it would includes such rubbers as 2-methyl-5-vinylpyridine/butadiene; 2-ethyl-5-vinylpyridine/butadiene; 2-vinylpyridine/butadiene; and 2,4-dimethyl-6-vinylpyridine/butadiene. Similarly, the expression vinylpyridine-butadiene rubber would include terpolymers in which part of the vinylpyridine component is replaced with styrene, such as a rubber of 75% butadiene, 12.5% styrene, and 12.5% 2-methyl-5-vinylpyridine.

We have found that it is desirable to keep the interval between gassing and curing as short as is conveniently practicable, preferably no more than a few hours, although as long as seven days can elapse and there will still be at least a two-fold improvement in the adhesion. To assure maximum benefits from the invention we prefer a delay of no more than five hours, however.

The use of aniline-aldehyde condensation products according to the method of this invention leads to a very high adhesion between vulcanized, plied vinylpyridine-butadiene rubber stock and Hevea or GR-S or mixtures of the two. We have demonstrated this not only in laboratory tests on composite slabs but also in tests involving over 200 tires.

A further advantage of the present invention is that it adapts itself easily for factory practice. In the tire industry it is common practice to build a tire on a cylindrical form, known as a building drum, prior to placing the tire in the mold. The operator controls the rotation of this building drum by means of a foot pedal, as he applies the various layers of fabric and rubber. Whenever he deems it necessary, the operator renews the tack of the rubber surface by holding a solvent-soaked rag against the stock on the building drum as he rotates the drum. This procedure (gassing) can just as well be done with a solution of an aniline-aldehyde condensation product in the solvent as with the mere solvent itself.

Having thus described our invention, what we claim and desire to protect by Letters Patent is:

1. A method of obtaining enhanced adhesion between a vinylpyridine-butadiene rubber and a highly unsaturated hydrocarbon rubber stock in a vulcanized article which comprises applying an aniline-aldehyde condensation product formed by reacting aniline with an aliphatic aldehyde containing from 4 to 7 carbon atoms per molecule to a vulcanizable, highly unsaturated hydrocarbon rubber surface, superposing a vulcanizable vinylpyridine-butadiene rubber on the treated surface of the hydrocarbon rubber stock, and curing the resulting combination.

2. The method of claim 1 wherein the aniline-aldehyde condensation product is obtained by the reaction of aniline with an aldehyde selected from the group consisting of butyraldehyde, valeraldehyde, caproaldehyde, and heptaldehyde.

3. The method of claim 1 wherein the rubber stock is selected from the group consisting of Hevea rubber, cis-polybutadiene, cis-polyisoprene, and butadiene-styrene polymerization products.

4. The method of claim 1 in which said aniline-aldehyde condensation product is dissolved in an organic solvent.

5. A method of obtaining enhanced adhesion of a vinylpyridine-butadiene tread stock to a rubbery carcass material in a vulcanized pneumatic tire which comprises applying an aniline-aldehyde condensation product formed by reacting aniline with an alphatic aldehyde having 4 to 7 carbon atoms to the surface of a vulcanizable highly unsaturated hydrocarbon rubbery carcass material, superposing a vulcanizable vinylpyridine-butadiene rubber tread stock on said rubbery carcass material, and curing the resulting laminate to form a pneumatic tire.

6. A vulcanizable composite article comprising at least one layer of a highly unsaturated hydrocarbon rubber and at least one layer of a vinylpyridine-butadiene rubber in contact therewith wherein any surface of said hydrocarbon rubber which is in contact with any surface of said vinylpyridine-butadiene rubber is suffused with an aniline-aldehyde condensation product formed by reacting aniline with an aliphatic aldehyde containing from 4 to 7 carbon atoms per molecule.

7. The article of claim 6 wherein said hydrocarbon rubber stock is selected from the group consisting of Hevea rubber, cis-polybutadiene, cis-polyisoprene, and butadiene-styrene polymerization products.

8. A pneumatic tire having an enhanced adhesive bond between a highly abrasion-resistant tread stock and a highly unsaturated hydrocarbon rubber carcass material wherein said tread stock comprises a vinylpyridine-butadiene rubber; that surface of said carcass material which is to be bonded to said tread stock being suffused, before curing, with an aniline-aldehyde condensation product formed by reacting aniline with an aliphatic aldehyde having 4 to 7 carbon atoms.

9. The pneumatic tire of claim 8 wherein the rubbery carcass material is selected from the group consisting of Hevea rubber, cis-polybutadiene, cis-polyisoprene, and butadiene-styrene polymerization products.

10. The pneumatic tire of claim 8 wherein the vinylpyridine-butadiene polymeric tread stock contains at least 8% of vinylpyridine.

References Cited in the file of this patent

UNITED STATES PATENTS

| | | |
|---|---|---|
| 2,615,826 | Mallory et al. | Oct. 28, 1952 |
| 2,666,037 | Ingrassia | Jan. 12, 1954 |
| 2,694,028 | Rapp | Nov. 9, 1954 |
| 2,822,311 | Rowe et al. | Feb. 4, 1958 |